United States Patent [19]

Coté

[11] 4,015,093

[45] Mar. 29, 1977

[54] PHOTOFLASH ARRAY HAVING ELECTRICAL SHORTING MEANS

[75] Inventor: Paul T. Coté, Cleveland Heights, Ohio

[73] Assignee: General Electric Company, Schenectady, N.Y.

[22] Filed: Jan. 2, 1975

[21] Appl. No.: 538,036

[52] U.S. Cl. ............................................. 200/51.1
[51] Int. Cl.² ..................................... H01R 33/30
[58] Field of Search .......... 200/51.1, 51.11, 153 M, 200/51.03, 51.05; 240/1.3; 339/19

[56] References Cited

UNITED STATES PATENTS

| 1,658,832 | 2/1928 | Brown | 200/51.1 |
| 1,825,208 | 9/1931 | Rumble | 200/51.1 |
| 2,811,845 | 11/1957 | Schwartz et al. | 200/51.1 |
| 3,370,140 | 2/1968 | Betts | 200/51.1 |

Primary Examiner—David Smith, Jr
Attorney, Agent, or Firm—Norman C. Fulmer; Lawrence R. Kempton; Frank L. Neuhauser

[57] ABSTRACT

A photoflash lamp array having electrical terminals adapted to be connected to a camera socket. Means are provided for shorting the terminals when the array is out of a socket. This reduces the possibility of accidental flashing of lamps in the array when a connector terminal is touched by a person or object having an electrical potential such as an electrostatic voltage charge.

4 Claims, 10 Drawing Figures

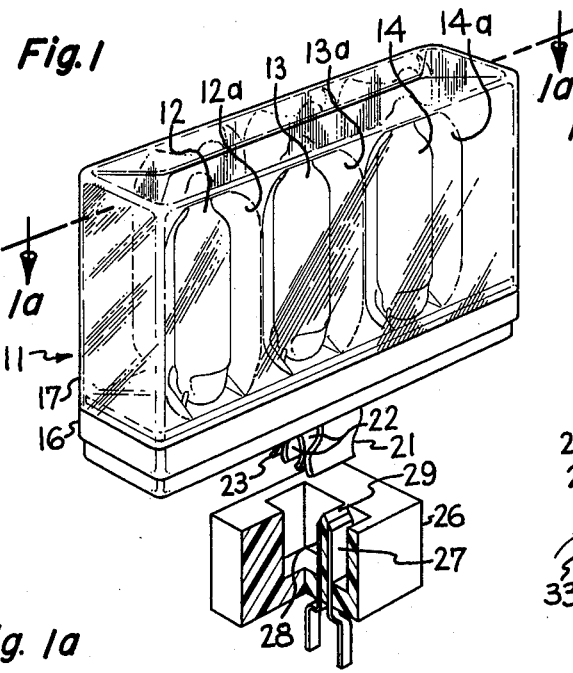
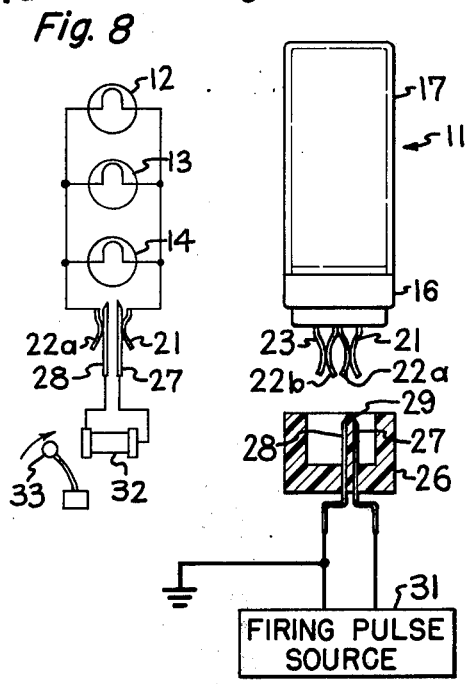
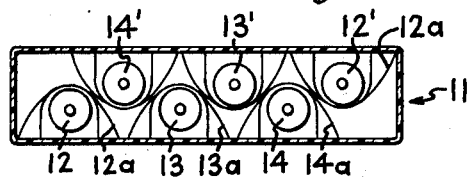
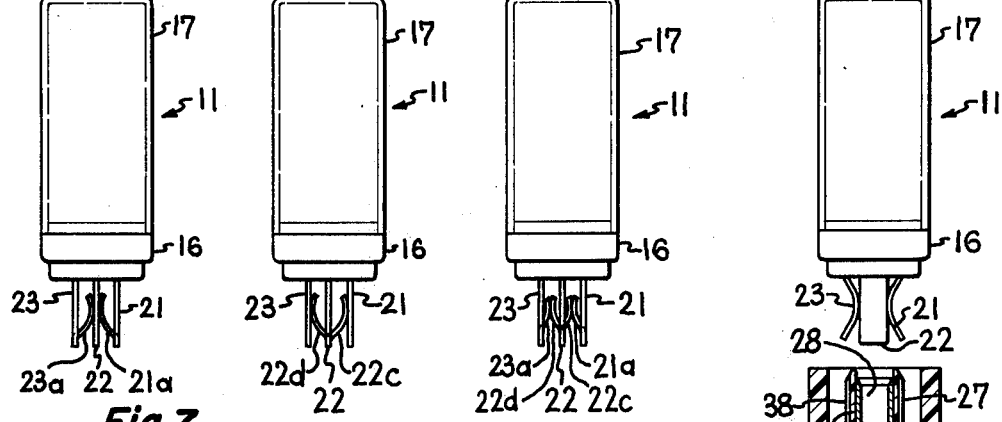
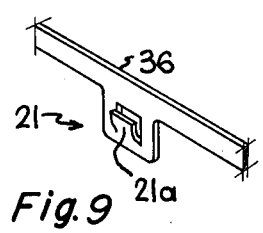
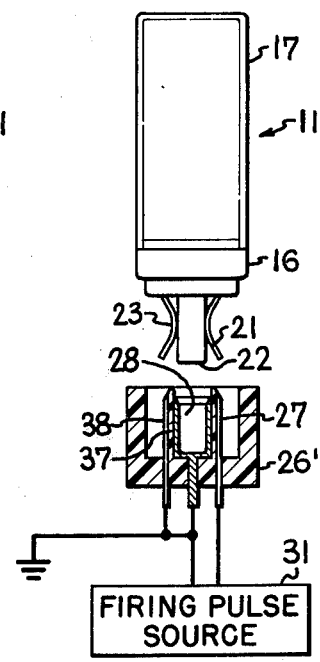

PHOTOFLASH ARRAY HAVING ELECTRICAL SHORTING MEANS

CROSS-REFERENCES TO RELATED APPLICATIONS

Ser. No. 485,422, filed July 3, 1974, Paul T. Cote', "Multiple Flash Lamp Unit", assigned the same as this invention.

Ser. No. 485,460, filed July 3, 1974, Paul T. Cote', "Protective Terminal for Multiple Flash Lamp Unit", assigned the same as this invention.

Ser. No. 538,037, Donald R. Schindler, filed concurrently herewith, "Spring Shorting Means for Photoflash Array", assigned the same as this invention.

BACKGROUND OF THE INVENTION

The invention is in the field of photoflash lamp arrays.

Various photoflash arrays have been proposed, and at least one type is now commercially available, containing a plurality of flash lamps. The arrays are provided with terminals for connecting the lamps, or lamp sequencing circuitry in the array, to a camera socket which provides a firing pulse (in synchronism with opening of the camera shutter) to the array for flashing a flash lamp when a flash picture is desired. Several flash pictures may be taken without moving or removing the array. A type of flash array having multiple connector terminals for connecting the flash lamps to a firing circuit in a camera is disclosed in U.S. Pat. No. 3,598,984 to Stanley Slomski and U.S. Pat. No. 3,598,985 to John Harnden and William Kornrumpf, and a type of flash array containing sequential lamp flashing circuitry and thus requiring only two connector terminals for connecting the array to a source of firing voltage pulses is disclosed in U.S. Pat. No. 3,532,931 to Paul Cote' and U.S. Pat. No. 3,668,421 to Harry Bowers. Some of the just-referenced patents also disclose dual-sided arrays having a first group of lamps at the front of the array and a second group of lamps at the back of the array. The array is plugged into a camera with one of the groups of lamps facing frontwardly, and when these lamps have been flashed, the array is turned around and the lamps of the other group are flashed.

The flash lamps in an array may be a low-voltage type requiring a voltage pulse of about 3 volts to 15 volts, for example, or may be a high-voltage type requiring a firing pulse of about 100 to 2000 volts or more of low energy. An example of a high-voltage flash lamp and a piezoelectric firing pulse source which produces a firing pulse when a piezoelectric element is impacted in synchronism with the opening of a camera shutter is disclosed in U.S. Pat. Nos. 2,972,937 and 3,106,080 to C. G. Suits. Flash arrays, and particularly if they employ high-voltage types of flash lamps which are flashed by a high-voltage pulse of low energy, are prone to electrostatic firing of one or more lamps if a connection terminal of the array is touched by a person or object having an electrostatic charge.

SUMMARY OF THE INVENTION

Objects of the invention are to provide an improved multiple flash lamp array; to provide means for preventing accidental electrostatic flashing of lamps in such an array; and to provide such accidental flash prevention in a manner that is feasible and economical to manufacture.

The invention comprises, briefly and in a preferred embodiment, a multiple flash lamp array having a group of flash lamps and having connector terminals for connecting the array to a socket of a camera or flash adapter unit. The terminals are connected to the flash lamps in the array directly, and/or indirectly by way of sequencing switching circuitry. Means are provided for electrically shorting the connector terminals when the array is out of a socket. This reduces the possibility of accidental flashing of lamps when a connector terminal is touched by a person or object having an electrostatic voltage charge. In a preferred embodiment, one or more of the connector terminals are shaped or bent so as to normally touch each other. When the array is plugged into a socket, a shoulder or rib of the socket forces the terminals apart so as to unshort them.

BRIEF DESCRIPTION OF THE DRAWING

FIG. 1 is a front perspective view of a flash lamp array and socket in accordance with a preferred embodiment of the invention.

FIG. 1a is a cross-sectional view of FIG. 1 taken on the line 1a—1a thereof.

FIG. 2 is a side view of the arrangement of FIG. 1.

FIGS. 3, 4 and 5 are side views of modifications of the embodiment of FIGS. 1 and 2.

FIG. 6 is a side view of a flash array and socket in accordance with an alternative embodiment of the invention.

FIG. 7 is a top view of the socket of FIG. 6.

FIG. 8 is an electrical schematic diagram of a group of flash lamps in the array, connected via a socket to a piezoelectric element which functions as a source of firing pulses for the lamps.

FIg. 9 is a perspective view of a connector terminal of the flash array.

DESCRIPTION OF THE PREFERRED EMBODIMENTS

The general arrangement of flash lamps, reflectors, and housing to form the flash array 11 is like that of the above-referenced Bowers patent, but the invention is not limited to any particular type of general construction arrangement. A first group of flash lamps 12, 13 and 14 are arranged in a row toward the front of the array, and are respectively provided with reflectors 12a, 13a and 14a arranged to direct light from the lamps, when flashed, frontwardly of the array 11. A similar group of flash lamps 12', 13' and 14' are arranged toward the back of the array, and are respectively provided with reflectors 12'a, etc., to direct light from that side of the array when flashed. The terms "front" and "back" of the array are used in the relative sense, because this particular array is a dual-sided array and can be plugged into a socket with either side facing frontwardly, and only the lamps facing frontwardly will be flashed, whereupon the array is turned around and the then frontwardly facing lamps are flashed. The lamps are connected by their lead-in wires to electrical conductors carried in a base 16 of the array, and a transparent cover 17 which can be made of plastic, as can be the base 16, is positioned over the lamps and reflectors and attached to the base 16. The cover 17 may be clear or may be provided with a bluish tint to provide color correction for the flash lamps in well-known manner.

Electrical connector terminals 21, 22 and 23 extend downwardly from the base 16, and are connected to the lamps in the array in the manner shown in FIG. 8 as will be described. The terminal 22 is shown in FIGS. 1 and 2 as having two parts, designated 22a and 22b in FIG. 2, which parts may be electrically integral. The terminal 22, or 22a and 22b, is connected electrically in common to all of the flash lamps of the array, or to sequencing circuitry for all of the lamps in the array, including both the "front" and "back" groups of lamps. The terminal 21 is connected to lead-in wires of the "front" group of lamps 12, etc., or to sequential firing circuitry for this group of lamps, and the terminal 23 is connected to lead-in wires of the "back" group of lamps 12', etc., or to sequential firing circuitry for this group of lamps. The center common terminal 22 may comprise a single member, as shown in FIGS. 3, 4 and 5, or may be a two-part terminal comprising members 22a and 22b, as shown in the embodiment of FIGS. 1 and 2.

The terminals 21, 22 and 23 are shaped, for example as shown in the embodiment of FIGS. 1 and 2, so that each of the outer terminals 21 and 23 electrically contacts the center common terminal 22a and 22b, whenever the array 11 is not plugged into a socket. Preferably, the terminals curve towards one another to make contact, and then curve away from each other at the bottom edges of the terminals, as shown.

A socket 26 is provided for receiving the terminals 21, 22 and 23 of the flash array 11. The socket 26 comprises a pair of electrical contacts 27, 28 arranged substantially mutually parallel and separated by a rib member 29 of plastic or other electrically insulating material, which preferably is tapered or pointed along the upper edge thereof, as shown. The upper edges of the contacts 27 and 28 may also be beveled in planar conformity with the beveled upper edge of the rib 29, as shown.

The socket contacts 27 and 28 are connected to a firing pulse source 31, which may comprise a piezoelectric voltage-generating element 32 as shown in FIG. 8. An impactor 33 is arranged to impact against and deform the piezoelectric element 32 in synchronism with the opening of a camera shutter, thus generating a firing voltage for flashing one of the flash lamps in the array 11, as disclosed in the above-referenced Suits patents. When the array 11 is plugged into the socket 26 with the group of lamps 12, 13 and 14 facing frontwardly of the socket 26 (and of the camera or flash adapter which carries the socket), the rib 29 forces apart the array terminals 21 and 22a, and these terminals respectively slide downwardly and in contact against the socket contacts 27 and 28, as shown in FIG. 8. Thus, the front group of lamps in the array is electrically connected to the source of firing pulses, and the lamps at the rear of the array remain electrically shorted because their terminal 23 remains in electrical contact against the common terminal 22. Therefore, only the front group of lamps, no matter which of the group of lamps faces frontwardly, can be fired, and the group of lamps facing rearwardly cannot be flashed. When the frontwardly facing lamps have been flashed, the array is removed from the socket, turned around, and reinserted in the socket, whereby the terminals 22 and 23 become separated by the rib 29 and make electrical contact respectively with the socket contacts 27 and 28.

In the electrical circuit embodiment shown in FIG. 8, all of the lamps 12, 13, 14 of the "front" group of lamps are connected in electrical parallel to the array terminals 21 and 22a. Similarly, the "rear" group of lamps 12', 13', 14' are connected electrically in parallel with the terminals 22b and 23. In such an arrangement, the lamps 12, 13, 14, etc., of the parallel connected group flash at differing firing voltages, for example in steps of a few hundred volts, whereupon the first firing pulse flashes the lamp having the lowest firing voltage characteristic, etc.

As shown in the drawing, and in accordance with a feature of the invention, the terminals 21, 22 and 23 of the array and the contacts 27 and 28 of the socket are arranged so that as the array 11 is being plugged into the socket 26, the terminals 21 and 22 (or 22 and 23 if the array is turned around) momentarily short across the contacts 27 and 28 prior to the array terminals being spread apart by the rib 29 and contacts 27 and 28, so as to short out and discharge any residual voltage charge which may be in the firing pulse source 31. Such a residual or remanent voltage charge can occur, for example, when the piezoelectric element 32 is impacted and stressed during a non-flash picture. This may cause partial voltage breakdowns to occur within the piezoelectric element. For example, assume that a non-loaded piezoelectric element is impacted and produces a voltage pulse of 2000 volts which is partially dissipated due to direct partial voltage breakdown or sparking or a partial corona discharge to a value of 1000 volts, upon unstressing of the element after the impact, it will produce a reverse voltage of 2000 volts and thus will retain a residual voltage of 1000 volts of opposite polarity from the impact-produced pulse, and this residual voltage can remain long enough and at a high enough voltage to flash a lamp when the lamp or a unit containing the lamp is plugged into the socket.

The embodiments of FIGS. 3, 4 and 5 are similar to that just described, except for different arrangements for normally shorting among connector terminals. In FIG. 3, the connector terminals 21, 22 and 23 are essentially stiff and rigid, and the two outer terminals 21 and 23 are provided with somewhat resilient members 21a and 23a which normally engage against the center terminal 22. The resilient normally shorting members 21a and 23a may be resilient members attached to the terminals 21 and 23, or may be comprised of integral struck-out tabs, as shown in FIG. 9, which also shows the terminal 21 comprising a connector rail 36 along the top thereof, to which lead-in wires of the flash lamps may be electrically connected. The other terminals may be provided with similar connector rails. When the flash array 11 of FIG. 3 is plugged into a socket, such as the socket 26 in FIGS. 1 and 2, the shorting tab 21a or 23a, whichever is associated with the frontwardly facing flash lamps, becomes forced out of engagement with the center terminal 22 so that the frontwardly facing group of lamps, or their firing sequence circuit, will be electrically connected to the socket contacts, while the shorting tab of the rearwardly facing lamps remains in shorting position so that the rearwardly facing lamps cannot be flashed.

The embodiment of FIG. 4 is essentially the same as FIG. 3, except that the shorting tabs 22c and 22d extend from the center terminal 22 and into electrical engagement with the other terminals 21 and 23. FIG. 5 is similar to FIGS. 3 and 4, except that both the outer terminals 21 and 23 are provided with normally shorting tabs 21a and 23a, and also the center terminal 22 is provided with shorting tabs 22c and 22d. When the array is out of a socket, the tabs 21a and 22c electrically engage each other, and tabs 22d and 23a engage each other, for shorting out the groups of lamps or the sequencing circuitry for the lamps.

The embodiment of FIG. 6 is essentially similar to the embodiments that have been described, except that the array and socket are arranged so that the array can be rotated to turn the rearwardly facing group of lamps towards the front without removing the array from the socket. In this embodiment, the center common terminal 22 of the flash array is a post which may be cylindrical in shape, and may be made of metal or metal-coated plastic. The outer terminals 21 and 23 are shaped to normally electrically engage the center cylindrical terminal 22, as shown, similarly to the embodiment of FIGS. 1 and 2; however, shorting tabs may be provided, instead, in accordance with the embodiments of FIGS. 3, 4 and 5. In the socket 26', the rib is in the form of a shell or annular rib 37 having a circular opening for accommodating the flash array terminal post 22, with a portion or all of the interior of the opening being lined with the socket contact 28. The socket contact 27 is positioned at the front of the annular rib 37, and makes contact with the front terminal 21 or 22 of the array, and an additional socket contact 38 is positioned at the rear of the annular rib 37, which makes contact with the rearward terminal 21 or 23, when the array 11 is plugged into the socket. The rear contact 38 is electrically connected to the center contact 28, as shown in FIG. 6, and is considered to be the electrical ground of the system. Thus, when the array 11 of FIG. 6 is plugged into the socket, the front terminal 21 or 23 and the common terminal 22 are connected electrically to the firing pulse source 31, and the rear terminal 21 or 23 is electrically connected to the center terminal 22 by way of the socket contacts 38 and 28, so that the rearwardly facing group of lamps cannot be flashed.

Four or five or more lamps can be provided in each of the groups of lamps. Also, a one-sided flash array can be employed, utilizing the invention, instead of the dual-sided array that has been described.

The invention achieves its objectives of providing a flash array in which the lamps cannot be accidentally flashed by electrostatic voltage charges when the connector terminals are touched by a person or object having an electrostatic charge. Also, the invention achieves additional benefits of temporarily shorting the firing pulse source as the array is being plugged into a socket, thereby discharging any residual voltage charge in the firing pulse source. Also, in the case of a dual-sided array as has been described, the invention electrically shorts the rearwardly facing group of lamps when the array is plugged into a socket, thereby preventing any accidental flashing of a rearwardly facing lamp.

While preferred embodiments and modifications of the invention have been described, various other embodiments and modifications will become apparent to persons skilled in the art, and will fall within the scope of the invention as defined in the following claims. The term "rib" as used herein includes a separator member (29 or 37) flanked by contacts, and also contacts suitably rigid and supported to function as a rib for forcing apart the array terminals.

What I claim as new and desire to secure by Letters Patent of the United States is:

1. A flash lamp array having a set of electrical connector terminals adapted to be connected to a socket, said terminals comprising substantially rigid blades in mutually parallel spaced apart relationship, at least one of said blades being provided with an integral tab struck out of the blade and shaped to normally touch another of said blades, said socket being provided with a rib which forces said tab away from its said normal contact with a terminal blade.

2. An array as claimed in claim 1, in which two adjacent said blades are provided with integral tabs struck out of the blades and which extend toward and touch one another.

3. A flash lamp array having first and second groups of lamps arranged to emit light from opposite sides of the array, a first set of terminals extending substantially mutually parallel from the array and adapted to be connected to a socket, said terminals being shaped to normally touch one another and being connected in the array to cause flashing of lamps in said first group of lamps in response to firing voltage applied to the terminals, and a second set of terminals extending from the array substantially parallel to said first set of terminals and shaped to normally touch one another and connected to cause flashing of lamps in said second group of lamps in response to firing voltage applied to the second set of terminals, said array being adapted to be plugged into said socket with either of said groups of lamps facing a given direction, said socket being provided with a rib which forces a set of said touching terminals apart when the array is plugged into the socket, said terminals and socket being arranged so that the only terminals forced apart by said rib of the socket are those connected to cause flashing of the group of lamps facing said given direction, whereby terminals of the remaining set of terminals remain shorted together while the array is in the socket.

4. A flash lamp array having first and second groups of lamps arranged to emit light from opposite sides of the array, a first set of terminals extending substantially mutually parallel from the array and adapted to be connected to a socket, said terminals being shaped to normally touch one another and being connected in the array to cause flashing of lamps in said first group of lamps in response to firing voltage applied to the terminals, and a second set of terminals extending from the array substantially parallel to said first set of terminals and shaped to normally touch one another and connected to cause flashing of lamps in said second group of lamps in response to firing voltage applied to the second set of terminals, said first set of terminals comprising a conductive post extending from the array and a first conductive member extending from the array substantially parallel to and normally touching the side of said post, said second set of terminals comprising said conductive post and a second conductive member extending from the array substantially parallel to and normally touching the side of said post opposite from said first conductive member, said socket having an annular rib adapted to receive said conductive post and permit rotation of said array with said post remaining in said annular rib, said conductive members being slanted away from said post so as to both be forced apart from said post by said annular rib when said post is inserted into said annular rib, a first socket contact within said annular rib for electrically contacting said post, and second and third socket contacts on the outside of said annular rib at opposed sides thereof, whereby said conductive members of the array respectively electrically contact said second and third socket contacts in each of two 180° apart rotational positions of said array with respect to said socket, means connecting said first and second socket contacts to a source of lamp firing pulses, and means electrically connecting together said second and third socket contacts.

* * * * *